(12) United States Patent
Kobayashi et al.

(10) Patent No.: US 10,266,043 B2
(45) Date of Patent: Apr. 23, 2019

(54) VEHICLE BODY STRUCTURE

(71) Applicants: HONDA MOTOR CO., LTD., Minato-ku, Tokyo (JP); TOYODA GOSEI CO., LTD., Kiyosu-shi, Aichi-ken (JP)

(72) Inventors: Futoshi Kobayashi, Wako (JP); Hiroshi Sugawa, Kiyosu (JP)

(73) Assignees: Honda Motor Co., Ltd., Tokyo (JP); Toyoda Gosei Co., Ltd., Alchi-ken (JP)

( * ) Notice: Subject to any disclaimer, the term of this patent is extended or adjusted under 35 U.S.C. 154(b) by 14 days.

(21) Appl. No.: 15/641,588

(22) Filed: Jul. 5, 2017

(65) Prior Publication Data

US 2018/0009301 A1 Jan. 11, 2018

(30) Foreign Application Priority Data

Jul. 6, 2016 (JP) .................................. 2016-133906

(51) Int. Cl.
*B60J 1/17* (2006.01)
*B60J 10/77* (2016.01)
*B60J 5/04* (2006.01)

(52) U.S. Cl.
CPC .................. *B60J 10/77* (2016.02); *B60J 1/17* (2013.01); *B60J 5/04* (2013.01)

(58) Field of Classification Search
CPC .................. B60J 10/77; B60J 5/04; B60J 1/17
USPC .............................................. 296/146.9, 153
See application file for complete search history.

(56) References Cited

U.S. PATENT DOCUMENTS

| | | | | |
|---|---|---|---|---|
| 2,687,914 A | * | 8/1954 | Schrum | B60J 10/80 49/493.1 |
| 4,026,598 A | * | 5/1977 | Koike | B60J 10/248 296/146.9 |
| 6,007,140 A | * | 12/1999 | Heitmann | B60J 10/24 296/146.9 |
| 9,475,373 B2 | * | 10/2016 | Sobue | B60J 10/277 |
| 9,573,451 B1 | * | 2/2017 | Bach | B60J 10/84 |
| 2003/0122400 A1 | * | 7/2003 | Berglund | B60R 13/04 296/146.9 |
| 2006/0082189 A1 | * | 4/2006 | Sultan | B60J 10/248 296/146.9 |

FOREIGN PATENT DOCUMENTS

JP S60-160255 U 10/1985

* cited by examiner

*Primary Examiner* — Pinel E Romain
(74) *Attorney, Agent, or Firm* — Carrier Blackman & Associates, P.C.; William D. Blackman; Joseph P. Carrier

(57) ABSTRACT

A vehicle body structure is provided that prevents a glass window in a fully closed state from moving toward inside a vehicle. The vehicle body structure for use with a door includes: a vehicle body; and a run channel that is interposed for sealing between the vehicle body and a glass window that is slidably arranged in the door, wherein the run channel includes a base portion that is mounted to the vehicle body, and a hollow frame portion that elastically contacts the glass window and defines a hollow portion with the base portion, and the hollow frame portion is deformed when the glass window is fully closed so that the hollow portion is shrunk by the glass window, to cause at least a part of the hollow frame portion to closely contact the base portion.

9 Claims, 2 Drawing Sheets

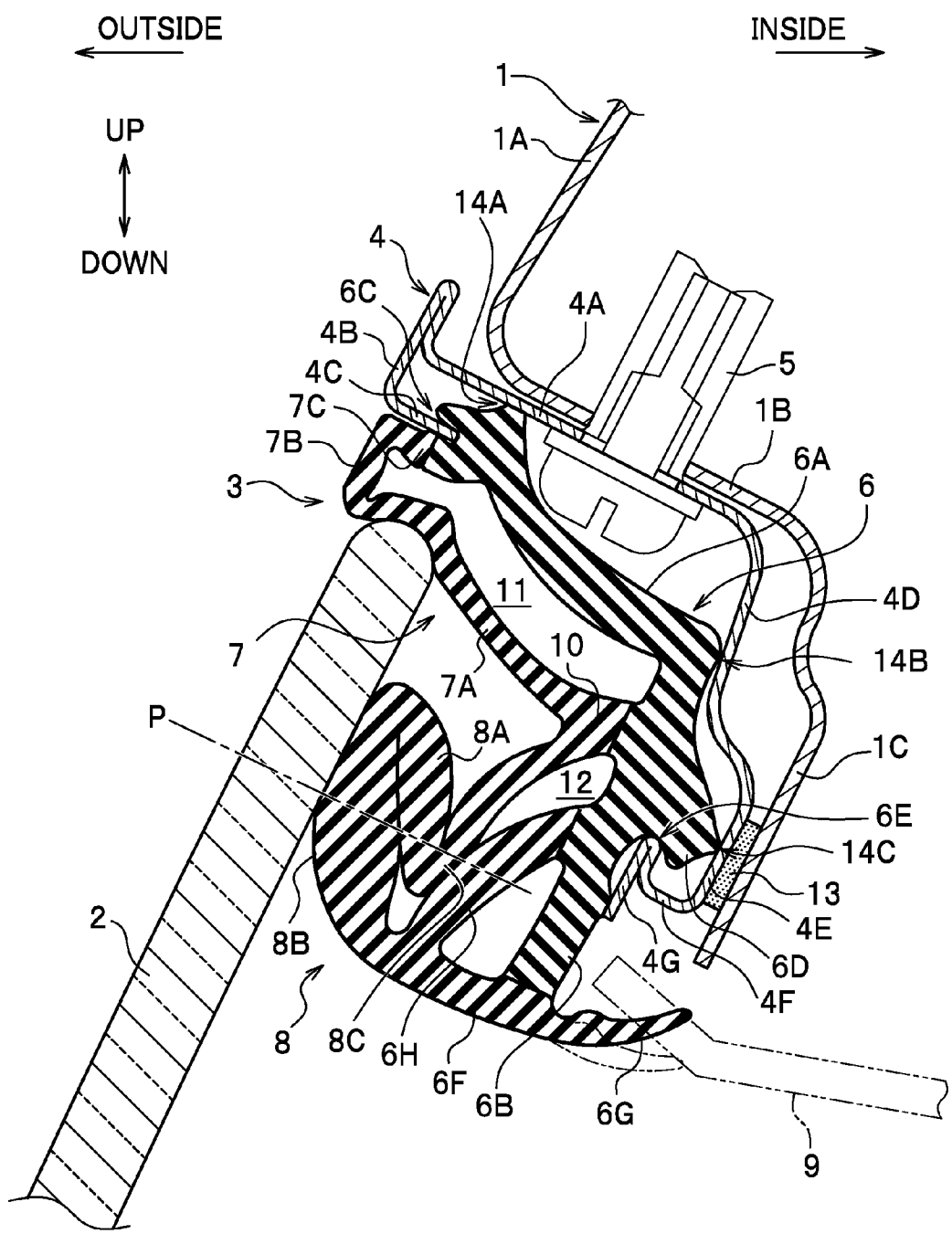

VEHICLE BODY STRUCTURE

CROSS REFERENCE TO RELATED APPLICATION

This application claims the benefit of priority to Japanese Patent Application No. 2016-133906 filed on Jul. 6, 2016, the disclosures of all of which are hereby incorporated by reference in their entireties.

FIELD OF THE INVENTION

The invention relates to a vehicle body structure such as an automobile.

DESCRIPTION OF THE RELATED ART

An example of a glass window sealing structure in a sashless door is described in Japanese Utility Model Application Publication No. S60-160255 which discloses a technique such that the inner face of a glass window is sealed with an inner lip when the glass window is fully closed.

SUMMARY OF THE INVENTION

However, according to the technique disclosed in Japanese Utility Model Publication No. S60-160255, there is a gap between the inner lip and a sealing main body when the glass window is fully closed. If an excessive external force or the like toward inside a vehicle is applied to the glass window, the inner lip is displaced toward the gap, so that the glass window is easily moved to inside the vehicle. In this case, a stepped portion is defined between an outer lip of the sealing member that exposes outside and an outer face of the glass window, which may impair appearance around the glass window.

The invention intends to solve such a problem, and it is an object of the invention to provide a vehicle body structure that prevents a glass window from moving toward inside a vehicle when the glass window is fully closed.

SUMMARY OF THE INVENTION

To solve the problem above, the invention provides a vehicle body structure for use with a door, comprising: a vehicle body; and a run channel that is interposed for sealing between the vehicle body and a glass window that is slidably arranged in the door, wherein the run channel includes a base portion that is mounted to the vehicle body, and a hollow frame portion that elastically contacts the glass window and defines a hollow portion with the base portion, and the hollow frame portion is deformed when the glass window is fully closed so that the hollow portion is shrunk by the glass window, to cause at least a part of the hollow frame portion to closely contact the base portion.

According to the invention, with the hollow portion, the run channel is elastically deformed with ease to make resistance between the run channel and the glass window smaller, so that the glass window is opened and closed in the vertical direction smoothly. Further, when the glass window is fully closed, the hollow frame portion closely contacts the base portion to increase the support rigidity of the glass window as compared with a state before the hollow portion is shrunk, to prevent the glass window from moving toward inside the vehicle. Therefore, the exterior face of the glass window is stably positioned to maintain the appearance of the glass window favorably.

Further, in the invention, the vehicle body structure further includes a movement restricting member that restricts the run channel from moving toward outside a vehicle, wherein the run channel elastically contacts the vehicle body only via the movement restricting member.

If the run channel is disposed so as to elastically contact both the movement restricting member and the vehicle body, the mounting accuracy of the run channel is not increased due to variations in mounting position of the movement restricting member with respect to the vehicle body. On the contrary, the run channel elastically contacts the vehicle body via the movement restricting member only as in the invention, so that the variations in mounting position of the movement restricting member with respect to the vehicle body need not be taken into consideration. Therefore, the mounting accuracy of the run channel is improved. Further, since another member needs not be newly added and the movement restricting member is used, the structure is made simple with the reduced number of members.

Further, in the invention, an exterior face of the movement restricting member is arranged to be flush with an exterior face of the run channel.

According to the invention, a stepped portion is not defined between the movement restricting member and the run channel, and a stepped portion between the exterior face of the glass window and the movement restricting member is minimized, so that the appearance around the glass window is favorably maintained.

Further, in the invention, the movement restricting member includes a first movement restricting portion that restricts the movement of the run channel toward outside the vehicle at an outer end of the movement restricting member, and a second movement restricting portion that restricts a movement of the run channel toward inside the vehicle at an inner end of the movement restricting member.

According to the invention, the run channel is stably held in a right position by the first and second movement restricting portions without being misaligned, so that the appearance of the run channel is favorably maintained.

Further, in the invention, the movement restricting member is in contact with the run channel between the first movement restricting portion and the second movement restricting portion.

According to the invention, the run channel is prevented from being deformed and inclined as compared with a case where the run channel is supported only by the first and second movement restricting portions, so that the run channel is maintained in a more stable manner.

Still further, in the invention, a space is defined between the vehicle body and the movement restricting member for separating in an inner-outer direction of the vehicle, and an elastic member that elastically contacts the vehicle body and the movement restricting member is disposed in the space.

With the space, the run channel is positioned only by the movement restricting member regardless of variations in portions of the vehicle body. Accordingly, the variations in mounting positions of the movement restricting member with respect to the vehicle body need not be considered, to increase the mounting accuracy of the run channel. Further, the elastic member is disposed in the space to absorb the variations, and the movement restricting member is stably maintained to prevent a noise caused by the movement restricting member contacting the vehicle from being generated.

According to the invention, the glass window in a fully closed state is prevented from moving toward inside the vehicle, to maintain the appearance around the glass window favorably.

BRIEF DESCRIPTION OF THE DRAWINGS

FIG. 2 is a side view of the vehicle body structure according to the embodiment when the glass window is fully closed.

DETAILED DESCRIPTION OF THE PREFERRED EMBODIMENTS

Figure 1:
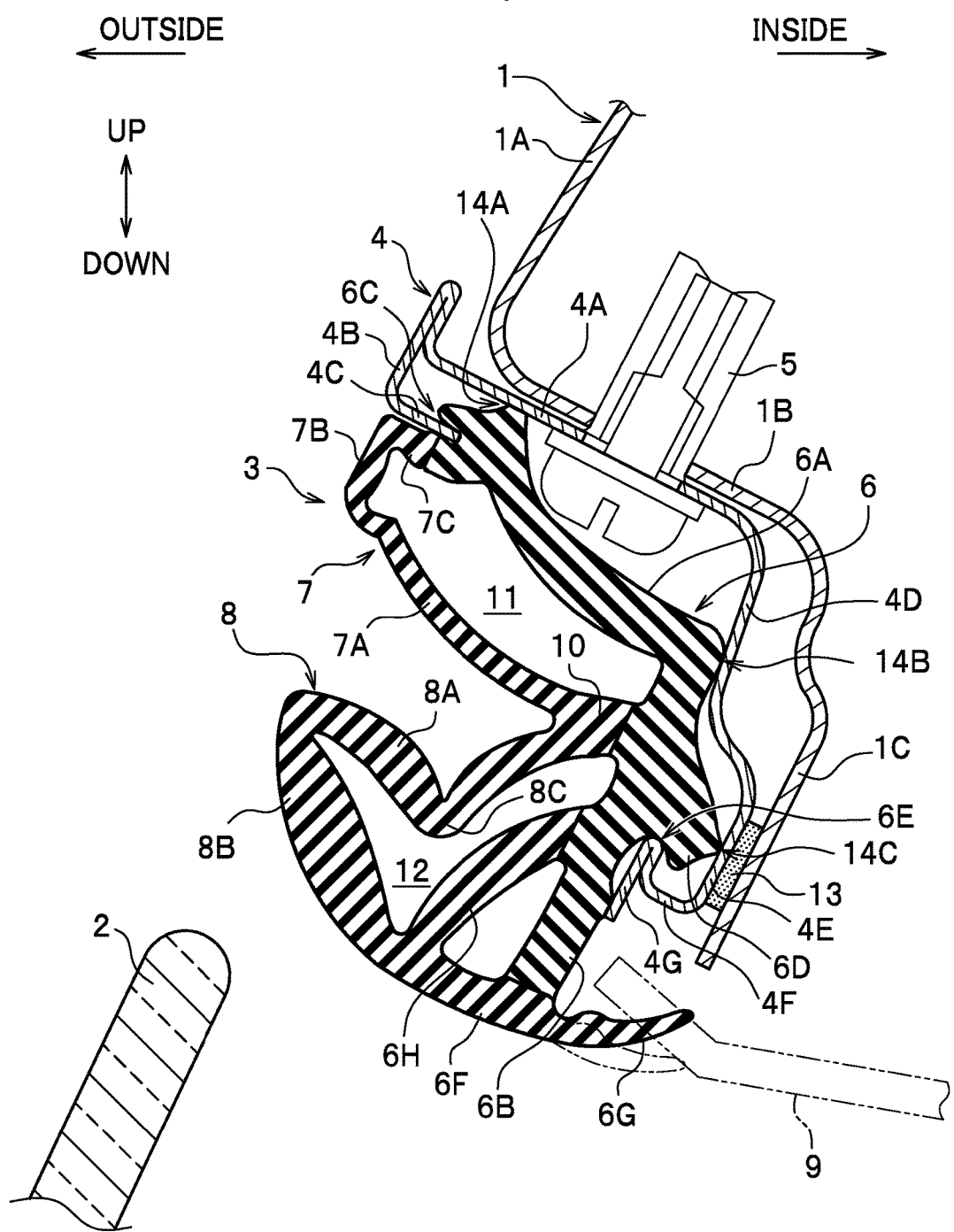
FIG. 1 is a side view of a vehicle body structure according to an embodiment when a glass window is opened.

An embodiment of a vehicle body structure according to the invention will be described which is applied to a vehicle body around a sashless side door. A vehicle body 1 includes: a roof end portion 1A to face outward in the vehicle width direction; a stepped face portion 1B that extends substantially orthogonally inward from the lower end of the roof end portion 1A so as to be displaced downward as it approaches toward inside a vehicle; and a lower edge face portion 1C that extends substantially orthogonally downward from the inner end of the stepped surface portion 1B so as to be displaced toward outside the vehicle. The lower edge face portion 1C is arranged as it extends downward substantially to be in parallel to a plate face of a glass window 2 that is arranged in a side door to slide in a vertical direction. A run channel 3 is arranged between the vehicle body 1 and the glass window 2. In the embodiment, the run channel 3 is mounted to the vehicle body 1 via a movement restricting member (retainer) 4.

<Movement Restricting Member 4>

The movement restricting member 4 includes: a mounted face portion 4A that extends in parallel to the stepped face portion 1B so as to be fixed thereto by a fixing pin 5; an exterior face portion 4B that slightly extends substantially orthogonally upward from the outer end of the mounted face portion 4A and then is folded downward to extend substantially in parallel to the glass window 2; a first restricting face portion (first movement restricting portion) 4C that slightly extends substantially in parallel to the mounted face portion 4A from the lower edge of the exterior face portion 4B toward inside the vehicle; a first inner face portion 4D that extends substantially orthogonally downward from the inner end of the mounted face portion 4A; a second inner face portion 4E that bends from the lower end of the first inner face portion 4D toward inside the vehicle and then further extends downward; a bottom face portion 4F that extends substantially orthogonally from the lower end of the second inner face portion 4E toward outside the vehicle; and a second restricting face portion (second movement restricting portion) 4G that slightly extends substantially orthogonally upward from the outer end of the bottom face portion 4F and is then folded downward. The second inner face portion 4E is arranged in parallel to, but on the outer side of, the lower edge face portion 1C via a space therebetween so as to face each other. The movement restricting member 4 is made of, for example, a pressed metal plate, but may be a resin member.

The first restricting face portion 4C as the outer end portion of the movement restricting member 4 is locked in a first locking portion 6C of the run channel 3 to restrict the movement of the run channel 3 outside the vehicle. The second restricting face portion 4G as the inner end portion of the movement restricting member 4 is locked in a second locking portion 6E of the run channel 3 to restrict the run channel 3 from moving toward inside the vehicle.

As described above, the space is defined between the lower edge face portion 1C and the second inner face portion 4E for separating in the inner-outer direction of the vehicle, and an elastic member 13 that elastically contacts the lower edge face portion 1C and the second inner face portion 4E is arranged in the space. The elastic member 13 is made of, for example, a synthetic rubber material, a resin material such as urethane foam or the like.

<Run Channel 3>

The run channel 3 is an elastic member that seals the glass window 2 when the glass window 2 is fully closed, and is made of a synthetic rubber material or the like. The run channel 3 includes a base portion 6 that is mounted to the vehicle body 1 via the movement restricting member 4, a first hollow frame portion 7 and a second hollow frame portion 8 that elastically contact the glass window 2.

<Base Portion 6>

The base portion 6 includes: an upper face portion 6A that extends in the vehicle width direction under the mounted face portion 4A to form a gradual circular arc in a convex shape downward so as not to be interfered with a head of the fixing pin 5; and a side face portion 6B that extends in approximately parallel to the glass window 2 downward from the inner end of the upper surface portion 6A. The first locking portion 6C that branches to two portions vertically is formed at the outer end of the upper face portion 6A. Further, the second locking portion 6E branched by a protruding portion 6D that slightly protrudes inward and downward is formed at the middle of the side face portion 6B in the height direction. As described above, the branched portion of the first locking portion 6C is locked with the first restricting face portion 4C and the branched portion of the second locking portion 6E is locked with the second restricting face portion 4G.

The lower portion of the side face portion 6B extends downward more than the first restricting face portion 4G, and a bottom face portion 6F that extends toward outside and inside the vehicle is formed at the lower end of the side face portion 6B. The inner end of the bottom face portion 6F is formed as a lip portion 6G that is deformed, as shown by the imaginary line, to hide the edge of a decorative ceiling plate 9 when the decorative ceiling plate 9 is mounted inside the vehicle. Further, a bridge portion 6H is formed to extend from the side face portion 6B at approximately the same height as the second restricting face portion 4G to the outer end of the bottom face portion 6F.

Here, as can be seen from the difference in hatching in FIG. 1, the run channel 3 includes a region of the upper face portion 6A and the side face portion 6B, and a region of the first hollow frame portion 7 and the second hollow frame portion 8, and the two regions are formed with different materials from each other. Since the latter region has a sealing function, it is formed of a soft synthetic rubber material, and since the former region has a supporting function to the vehicle body 1, it is formed of a material harder than that of the latter. Both of them are formed by, for example, two-color molding in one piece. In the embodiment, the bottom face portion 6F and the bridge portion 6H are also formed of the same material as the first hollow frame portion 7 and the second hollow frame portion 8. However, the bottom face portion 6F and the bridge portion 6H are not deformed much and are highly rigid due to the presence of the bridge portion 6H serving as a reinforcing rib. Therefore, in the embodiment, the "base portion 6"

includes, the bottom face portion 6F and the bridge portion 6H, in addition to the upper face portion 6A, the side face portion 6B, the first locking portion 6C, the protruding portion 6D and the second locking portion 6E.

The movement restricting member 4 is in contact with the base portion 6 between the first restricting face portion 4C and the second restricting face portion 4G. Specifically, the base portion 6 is partially in contact with the mounted face portion 4A, the first inner face portion 4D and the second inner face portion 4E of the movement restricting member 4 via contact portions 14A, 14B, 14C, respectively.

<First Hollow Frame Portion 7>

A hollow frame base portion 10 is formed above a base portion of the bridge portion 6H on the outer face of the side face portion 6B. The first hollow frame portion 7 and the second hollow frame portion 8 are formed to branch upward and downward toward outside the vehicle from the hollow frame base portion 10. The first hollow frame portion 7 serves to seal the upper edge of the glass window 2. The first hollow frame portion 7 includes: a lower face portion 7A that extends upward toward outside the vehicle in an arc shape from the hollow frame base portion 10 approximately along the upper face portion 6A; an exterior face portion 7B that extends upward approximately in parallel to the glass window 2 from the outer end of the lower face portion 7A; and an upper face portion 7C that slightly extends toward inside the vehicle from the upper end of the exterior face portion 7B so as to continue to the first locking portion 6C.

A first hollow portion 11 having a closed cross section is defined by the first hollow frame portion 7 configured as described above, the upper face portion 6A and the side face portion 6B of the base portion 6. As shown in FIG. 2, when the glass window 2 is fully closed, the lower face portion 7A is elastically deformed toward the first hollow portion 11 to seal the upper edge of the glass window 2. In addition, the exterior face portion 7B slightly protrudes toward outside the vehicle, more than the exterior face portion of the glass window 2, above the upper edge of the glass window 2 and below the exterior face portion 4B of the movement restricting member 4, so that the exterior face portion 7B is arranged to be flush with the exterior surface portion 4B.

<Second Hollow Frame Portion 8>

The second hollow frame portion 8 seals the inner face of the glass window 2 and serves to prevent the glass window 2 from being displaced toward inside the vehicle. As shown in FIG. 1, in the state where the second hollow frame portion 8 does not contact the glass window 2, the second hollow frame portion 8 includes: an upper face portion 8A that extends toward inside and outside the vehicle from a bent portion 8C to respectively form a gradual circular arc in a convex shape upward and the inner end thereof continues to the hollow frame base portion 10; and a side face portion 8B that extends downward from the outer end of the upper face portion 8A toward inside the vehicle and continues to the bottom face portion 6F and the outer end of the bridge portion 6H. The upper face portion 8A is approximately in a V-shape having the bent portion 8C as the bottom.

A second hollow portion 12 having a closed cross section is defined by the second hollow frame portion 8 configured as described above and the bridge portion 6H of the base portion 6. The second hollow portion 12 is defined as a substantially V-shaped space having the outer end of the bridge portion 6H as the bottom, in the state where the second hollow portion 12 does not contact the glass window 2.

<Workings and Advantageous Effects>

Since the second hollow portion 12 is defined in the run channel 3 that slidably contacts with the inner face of the glass window 2, the second hollow frame portion 8 pressed by the glass window 2 is elastically deformed with ease toward the second hollow portion 12. Therefore, the glass window 2 vertically opens and closes smoothly without being imposed with excessive resistance. As shown in FIG. 2, when the glass window 2 is completely closed, the side face portion 8B is pushed toward inside the vehicle, and accordingly, the second hollow portion 12 is shrunk and deformed to fold the upper face portion 8A in a substantially V-shape at the bent portion 8C. As a result, in the substantially orthogonal direction P with respect to the plate face of the glass window 2, the side face portion 8B is closely in contact with the upper face portion 8A which is folded in two layers, with no intervening hollow between the glass window 2 and the bridge portion 6H of the base portion 6. Thus, the support rigidity for the glass window 2 is increased as compared with a case where there is an intervening hollow to prevent the glass window 2 from moving toward inside the vehicle. The exterior face of the glass window 2 is stably positioned, so that the appearance of the glass window 2 is favorably maintained.

If the run channel 3 is disposed so as to elastically contact both the movement restricting member 4 and the vehicle body 1, the mounting accuracy of the run channel 3 is not increased due to variations in the mounting position of the movement restricting member 4 with respect to the vehicle body 1. On the contrary, if the run channel 3 elastically contacts the vehicle body 1 via the movement restricting member 4 only, the variations in the mounting position of the movement restricting member 4 with respect to the vehicle body 1 need not be taken into consideration. Therefore, the mounting accuracy of the run channel 3 is improved. Further, since another member needs not be newly added and the movement restricting member is used, the structure is made simple with the reduced number of members.

The exterior face portion 4B of the movement restricting member 4 is arranged to be flush with the exterior face portion 7B of the run channel 3, which does not define a stepped portion between the movement restricting member 4 and the run channel 3. Therefore, a stepped portion between the exterior face of the glass window 2 and the movement restricting member 4 is minimized, so that the appearance around the glass window 2 is favorably maintained.

The first restricting face portion 4C that restricts the movement of the run channel 3 toward outside the vehicle is arranged at the outer end portion of the movement restricting member 4, and the second restricting face portion 4G that restricts the movement of the run channel 3 toward inside the vehicle is arranged at the inner end portion of the movement restricting member 4. Therefore, the run channel 3 is stably held with the movement restricting member 4 and the appearance of the run channel 3 is favorably maintained. Even if the run channel 3 is mounted so as to be pushed into the movement restricting member 4 to have so-called spring back reaction by which the run channel 3 tries to return to the shape before being mounted, the run channel 3 is effectively prevented from being disengaged and misaligned from the movement restricting member 4, and the appearance of the run channel 3 is favorably maintained.

The run channel 3 is in contact with the contact portions 14A to 14C between the first restricting face portion 4C and the second restricting face portion 4G. Compared with a case where the run channel 3 is supported only by the first restricting face portion 4C and the second restricting face portion 4G, the run channel 3 is prevented from being deformed and inclined and is therefore maintained in a more stable manner.

The space is defined between the vehicle body 1 and the movement restricting member 4 for separating in an inner-outer direction and the elastic member 13 that elastically contacts the vehicle body 1 and the movement restricting member 4 is disposed in the space, to have the following effects. With the space, the run channel 3 is positioned only by the movement restricting member 4 regardless of variations in positions of the vehicle body 1. Accordingly, the variations in mounting position of the movement restricting member 4 with respect to the vehicle body 1 need not be considered, to increase the mounting accuracy of the run channel 3. Further, the elastic member 13 is disposed in the space to absorb the variations, and the movement restricting member 4 is stably maintained to prevent a noise caused by the movement restricting member 4 contacting the vehicle body 1 from being generated.

The preferred embodiment of the invention has been described above. The invention increases the support rigidity for the glass window 2 by closely contacting the hollow frame portion (second hollow frame portion 8) with the base portion 6. Specifically, as in the embodiment described above, the continuous region is preferably formed only with the hollow frame portion with no intervening hollow therein in an arbitrary linear direction running through the glass window 2 and the base portion 6 (in the embodiment, the substantially orthogonal direction P with respect to the plate face of the glass window 2), so that the support rigidity is further increased. In this case, it is acceptable if some space is left in other regions.

What is claimed is:

1. A vehicle body structure for use with a door, comprising:
   a vehicle body; and
   a run channel that is interposed for sealing between the vehicle body and a glass window that is slidably arranged in the door, wherein:
   the run channel includes a base portion that is mounted to the vehicle body, and a hollow frame portion that elastically contacts the glass window and defines a hollow portion with the base portion, the base portion and the hollow frame portion being formed in one piece, and
   the hollow frame portion is configured to be deformed when the glass window is fully closed so that the hollow portion is shrunk by the glass window, to cause at least a part of the hollow frame portion to closely contact the base portion.

2. The vehicle body structure according to claim 1 further comprising a movement restricting member that restricts the run channel from moving toward outside a vehicle;
   wherein the run channel elastically contacts the vehicle body only via the movement restricting member.

3. The vehicle body structure according to claim 2, wherein an exterior face of the movement restricting member is arranged to be flush with an exterior face of the run channel.

4. The vehicle body structure according to claim 3, wherein the movement restricting member includes a first movement restricting portion that restricts the movement of the run channel toward outside the vehicle at an outer end of the movement restricting member, and a second movement restricting portion that restricts a movement of the run channel toward inside the vehicle at an inner end of the movement restricting member.

5. The vehicle body structure according to claim 4, wherein the movement restricting member is in contact with the run channel between the first movement restricting portion and the second movement restricting portion.

6. A vehicle body structure for use with a door, comprising:
   a vehicle body; and
   a run channel that is interposed for sealing between the vehicle body and a glass window that is slidably arranged in the door,
   a movement restricting member that restricts the run channel from moving toward outside a vehicle;
   wherein the run channel includes a base portion that is mounted to the vehicle body, and a hollow frame portion that elastically contacts the glass window and defines a hollow portion with the base portion, and
   the hollow frame portion is deformed when the glass window is fully closed so that the hollow portion is shrunk by the glass window, to cause at least a part of the hollow frame portion to closely contact the base portion,
   wherein the run channel elastically contacts the vehicle body only via the movement restricting member,
   wherein a space is defined between the vehicle body and the movement restricting member for separating in an inner-outer direction of the vehicle,
   and wherein an elastic member that elastically contacts the vehicle body and the movement restricting member is disposed in the space.

7. A vehicle body structure for use with a door, comprising:
   a vehicle body; and
   a run channel that is interposed for sealing between the vehicle body and a glass window that is slidably arranged in the door,
   wherein:
   the run channel includes a base portion that is mounted to the vehicle body, a first hollow frame portion that elastically contacts the glass window and defines a first hollow portion with the base portion, and a second hollow frame portion that elastically contacts the glass window and defines a second hollow portion with the base portion, and
   the second hollow frame portion is deformed when the glass window is fully closed so that the second hollow portion is shrunk by the glass window, to cause at least a part of the second hollow frame portion to closely contact the base portion.

8. The vehicle body structure according to claim 1, wherein the run channel is configured to substantially prevent movement of the glass window toward an interior of the vehicle body when the glass window is fully closed.

9. The vehicle body structure according to claim 1, wherein the run channel is configured to substantially prevent movement of the glass window toward an interior of the vehicle body when the glass window is fully closed.

* * * * *